Sept. 15, 1942.  J. H. WIGGINS  2,295,767
VENT VALVE FOR GAS AND/OR LIQUID STORAGE TANKS
Filed Oct. 23, 1939  3 Sheets-Sheet 1
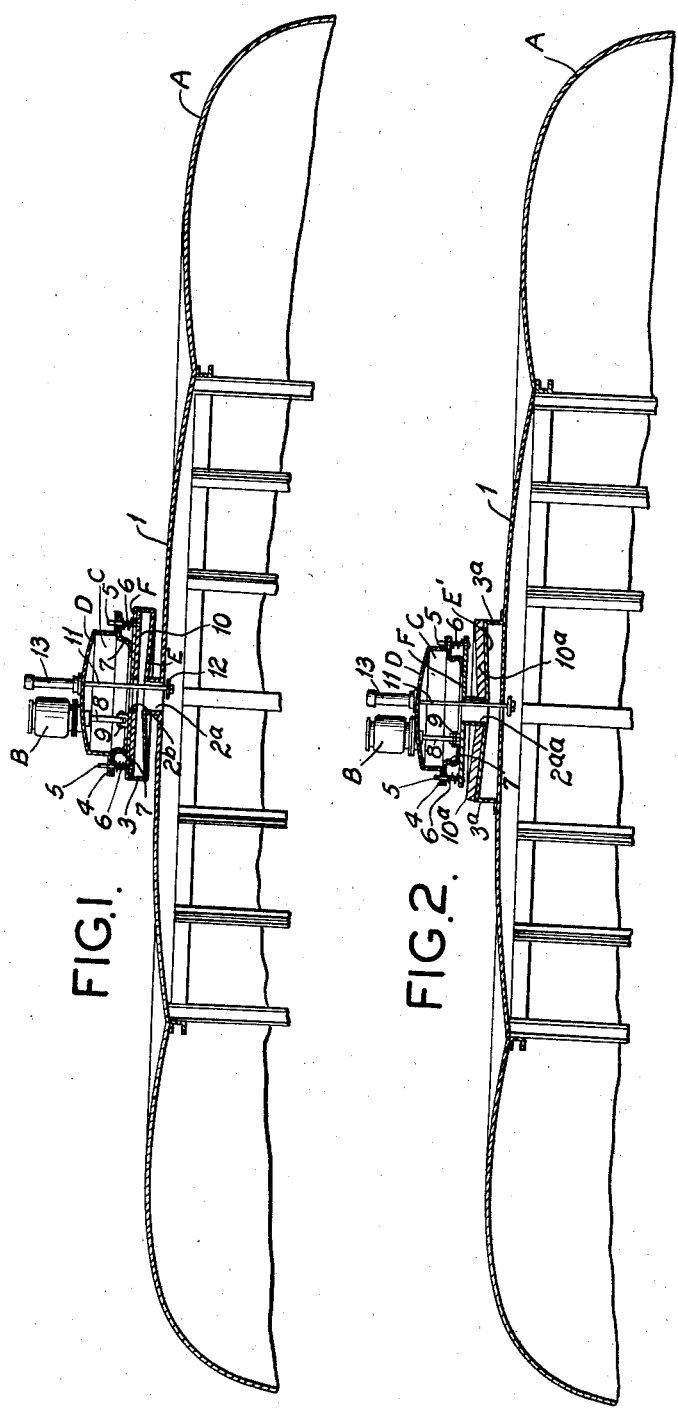
INVENTOR;
JOHN H. WIGGINS
BY
ATTORNEY Sept. 15, 1942.                J. H. WIGGINS                2,295,767
             VENT VALVE FOR GAS AND/OR LIQUID STORAGE TANKS
                  Filed Oct. 23, 1939            3 Sheets-Sheet 2
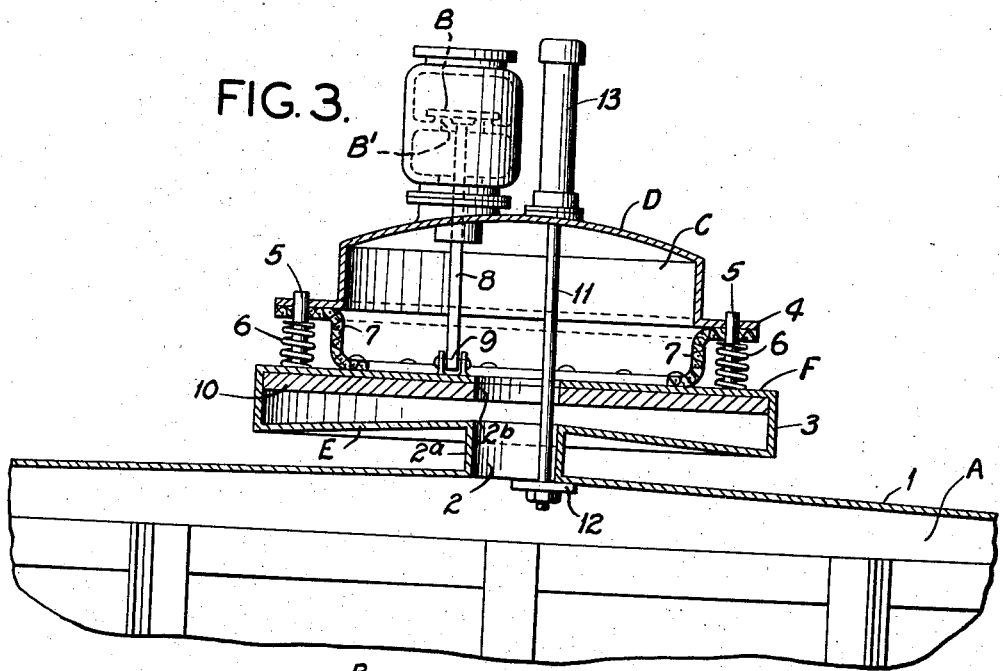
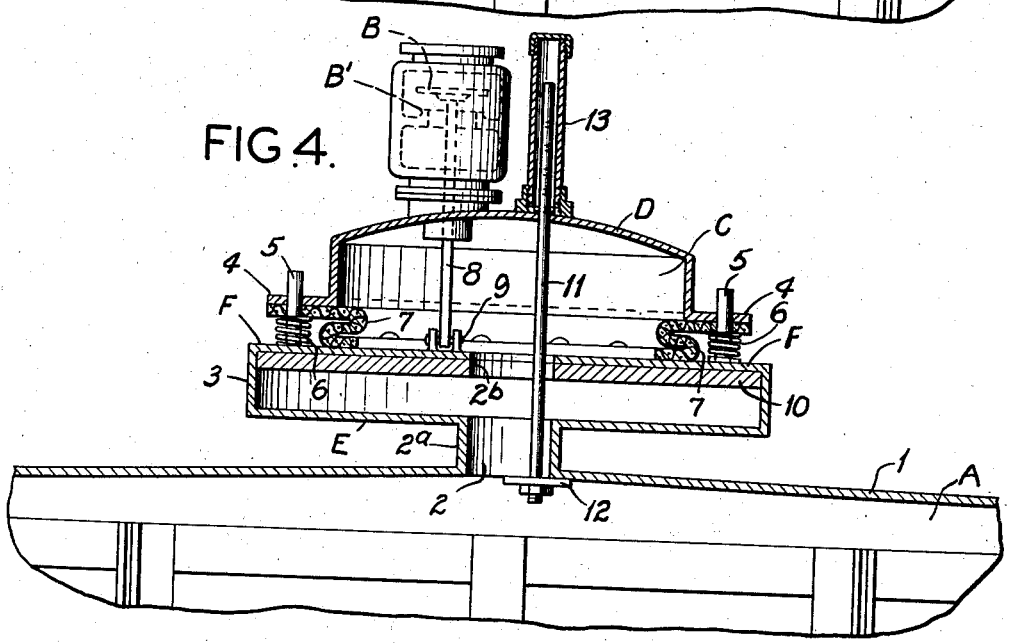
INVENTOR;
JOHN H. WIGGINS
BY Wells L. Church
ATTORNEY Sept. 15, 1942.  J. H. WIGGINS  2,295,767
VENT VALVE FOR GAS AND/OR LIQUID STORAGE TANKS
Filed Oct. 23, 1939  3 Sheets-Sheet 3
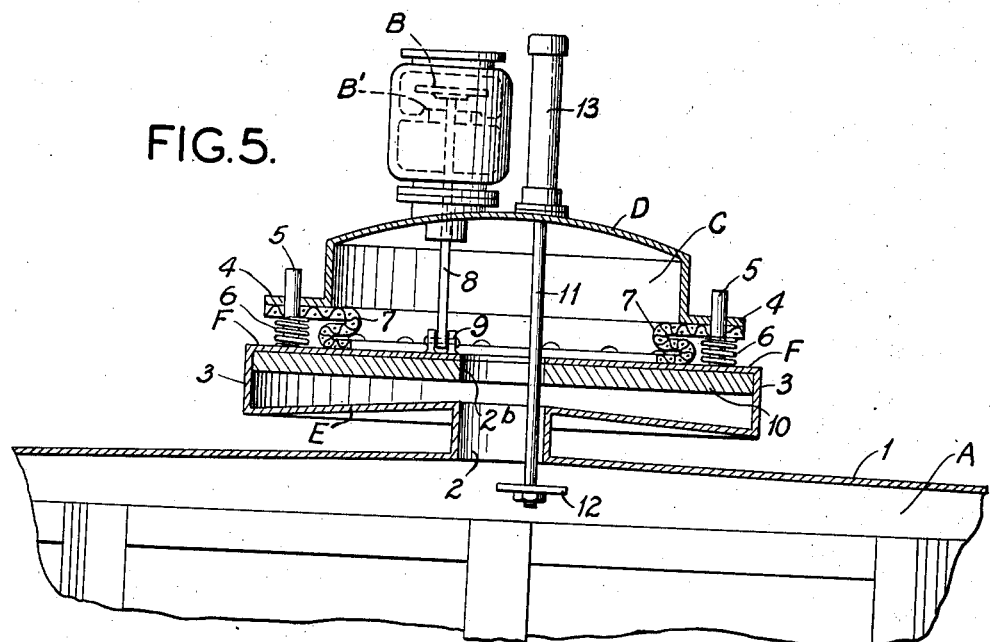
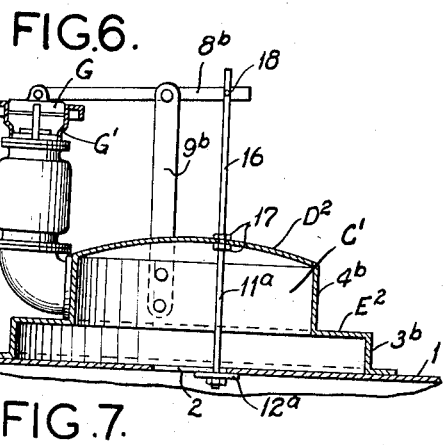
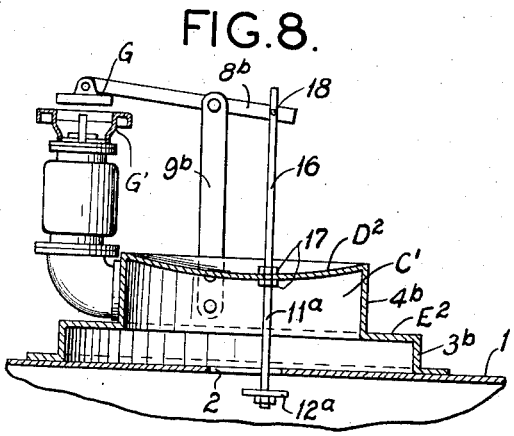
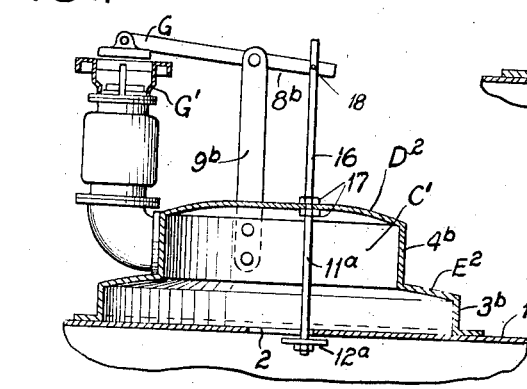
INVENTOR;
JOHN H. WIGGINS
BY Wells R. Church
ATTORNEY Patented Sept. 15, 1942

2,295,767

UNITED STATES PATENT OFFICE 2,295,767

VENT VALVE FOR GAS AND/OR LIQUID STORAGE TANKS

John H. Wiggins, Chicago, Ill.

Application October 23, 1939, Serial No. 300,713

6 Claims. (Cl. 220—85)

This invention relates to vent valves and relief valves of the kind that are used to provide pressure relief and/or vacuum relief for gas and/or liquid containers.

In my pending application Serial No. 149,461, filed June 21, 1937, now Patent No. 2,215,308, granted September 17, 1940, I have disclosed a venting means for containers of the kind that are used to hold gases and/or volatile liquids, that is composed of or which comprises a vent valve, and a control mechanism for said valve constructed in such a manner that when the container is under a positive pressure the seating action of said valve is enhanced, when a certain approximate internal pressure is reached in the container the enhanced seating action of said valve is automatically removed, and when a certain approximate minus pressure is created in the container, air or an equivalent medium is admitted to the container to provide vacuum relief. While the broad invention described in said application contemplates constructing the control mechanism for the vent valve in various ways, the particular form of control mechanism illustrated and described in said application comprises one pressure-operated element consisting of a vertically-movable roof for the gas space of the container, and a second pressure-operated element consisting of a diaphragm or equivalent flexible member carried by the roof, but constructed and arranged so that it is capable of moving independently of and relatively to the roof.

One object of my present invention is to provide another specific form of the broad invention disclosed in my said patent.

Another object is to provide a vent valve for gas and/or liquid containers, that has the desirable features and characteristics of the apparatus described in my said patent, but which is constructed in the form of a compact, self-contained unit that can be easily installed or mounted on various types and kinds of containers for gases and/or volatile liquids.

To this end I have devised a vent valve that comprises a gas chamber, or a plurality of connected gas chambers, separate and distinct from but in constant communication with the gas space of the container on which the valve is employed, a valve element for venting said gas chamber arranged so that it is normally held seated by a spring, gravity or in any other suitable way, a movable element arranged so that when the container is under normal pressure, the pressure of the gaseous medium confined in the container is exerted on said movable element in a manner to enhance the seating action of said valve, and a second movable element arranged so that when an abnormal pressure is created in the container, said second element will move in a direction or in a manner that effects the opening or unseating of the vent valve and permits gases to escape from the container, thus providing pressure relief for the container. In the particular form of my invention herein illustrated, the pressure-operated element first referred to is also constructed or arranged so that in the event a certain approximate minus pressure is created in the container, said minus pressure causes said element to move in a direction to effect the opening or unseating of said valve and admit air or the like to the gas chamber of the valve to provide vacuum relief. Also in the particular form of my invention herein illustrated, the two movable pressure-operated elements above referred to are combined in such a way that they form movable wall portions of one large gas chamber, or movable wall portions of two communicating or interconnected gas chambers, and they may consist either of flexible elements, such as diaphragms that form a portion or portions of the encasing or gas confining structure of the gas chamber, or rigid elements combined with flexible devices so as to form a portion or portions of the gas chamber.

Irrespective of the particular way the pressure-operated elements are constructed and arranged, my improved valve consists of a complete unit or a self-contained structure that has built into same the movable valve element, the gas chamber that communicates with the gas space of the container, the two movable elements which form, in effect, the actuating means for the valve element, and the parts or devices that transmit the movements of said pressure-operated elements to the valve element, or are used in conjunction with said pressure-operated elements to enhance the seating action of the valve, to open the valve to provide pressure relief, and to open said valve to provide vacuum relief. Hence, my improved vent valve is inexpensive to construct; it is compact; it is easy to install; and it may be used to convert practically any kind of a container into a gas holder that will vent automatically under a certain approximate internal pressure, that will remain absolutely tight while the internal pressure of the gas holder is building up to a point where venting becomes necessary or desirable, and which will breathe or admit air to the gas space of the holder to provide vacuum relief.

Figure 1 of the drawings is a vertical transverse sectional view of a container of the type commercially known as a "Spheroid," equipped with a vent valve embodying my present invention.

Figure 2 is a similar view, illustrating another form of vent valve constructed in accordance with my invention.

Figure 3 is an enlarged vertical sectional view of the vent valve illustrated in Figure 1, showing the position the parts of said valve assume when the container is under normal pressure.

Figure 4 illustrates the position of the parts of said valve when said valve opens to permit gases to escape from the container to provide pressure relief.

Figure 5 illustrates the position of the parts of the valve when said valve opens to admit air to the container to provide vacuum relief; and Figures 6, 7 and 8 are vertical sectional views, illustrating another form of my invention; Figure 6 showing the position which the parts of the valve assume when the container is under normal pressure; Figure 7 showing the position of the parts of the valve when the valve opens to provide pressure relief; and Figure 8 showing the position of the parts of the valve when the valve opens to afford vacuum relief.

In Figures 1 and 2 of the drawings I have illustrated two different forms of my improved vent valve installed on a container A of the type known commercially as a "Spheroid," which is provided with a roof or top I, that is substantially inflexible. As stated previously, however, my improved valve is capable of use with various types and kinds of containers, and is distinguished from the venting mechanism disclosed in my said patent, principally in that a breather type tank roof, balloon type roof, or other equivalent movable part that constitutes a wall portion of the gas chamber and part of the container per se is not relied upon to directly or indirectly cause movement of the valve element, but instead, the entire control mechanism for the valve element is separate and distinct from the container and is built into the valve, with the result that the valve constitutes a complete unit or unitary structure that can be easily applied to or combined with various types and kinds of containers. In the form of my invention illustrated in Figures 3, 4 and 5, the valve comprises a valve element B, a gas chamber or group of communicating gas chambers, designated by the reference character C, and hereinafter referred to for convenience merely as a gas chamber, a passageway 2 that connects said gas chamber with the gas space of the container on which the valve is employed, a movable element D that is used for two purposes, to wit, to enhance the seating action of the valve element B when the container A is under normal pressure, and to cause said valve element to open to provide vacuum relief when the container is under a certain approximate minus pressure, and a movable element E that is used to open the valve element B to provide pressure relief when the container is under an abnormal pressure, or in other words, when the pressure in the container A builds up to such an extent or degree that it is advisable or necessary to permit gases to escape from the container, and thus provide pressure relief. The valve element B, the two pressure-operated elements D and E and the means or mechanism that is used in conjunction with said pressure-operated elements to cause the valve element to function properly, are combined so as to form a unitary structure that can be easily installed as a unit on some portion of the container A, usually on the roof of the container.

In the valve shown in Figures 3, 4 and 5 the pressure-operated element E that is used to cause the valve element B to open to provide pressure relief, consists of a horizontally-disposed, flexible metal diaphragm of substantially annular form arranged so as to form in effect the bottom wall of the gas chamber, said diaphragm being connected at its center to a collar 2ª on the roof of the container that constitutes the passageway 2 between the gas space of the container and the gas chamber C of the valve structure. At the outer edge of said diaphragm E is an upwardly-projecting annular flange 3 that is attached to a horizontally-disposed supporting plate F, provided at its center with a hole 2ᵇ of such size that the spaces or chambers above and below said supporting plate are in constant communication with each other, and thus form the gas chamber C of the valve. The other pressure-operated element D of the valve that is used to enhance the seating action of the valve element B and to cause said valve element to open to provide vacuum relief, consists of a substantially-inverted, cup-shaped member, made of rigid material and arranged in superimposed relationship with the supporting plate F so as to form in effect the top wall or top portion of the gas chamber C. Said element D is mounted so that it is capable of moving vertically, upwardly and downwardly, with relation to the supporting plate F, and is herein illustrated as being provided at its periphery with a laterally-projecting flange 4 that has holes in same which receive rigid guide pins 5 that project upwardly from the supporting plate F. The element D is normally maintained in a certain approximate position with relation to the supporting plate F by supporting springs 6 mounted on the guide pins 5 at a point beneath the flange 4 on the element D. The gap or joint between the bottom edge of the element D and the supporting plate F is closed and made gas-tight, by a seal 7 of any suitable kind that will permit the movable top wall portion of the gas chamber to move vertically relatively to the supporting plate F. Usually, said seal will be formed by an annular-shaped element of gas-tight fabric attached to the supporting plate F and to the flange 4 on the element D.

The valve element B is connected to the supporting plate F in such a way that it cannot move vertically relatively to said supporting plate, and the seat B' of said valve element is carried by the pressure-operated element or top wall portion D, which as previously stated, is capable of moving upwardly and downwardly relatively to the supporting plate F. Accordingly, when the element D moves upwardly or away from the supporting plate F, due to the upward pressure exerted on said element D by the gaseous medium confined in the container A, the seating action of the valve element B will be enhanced, due to the fact that such movement of the element D causes the valve seat B' carried by the element D to be forced more tightly into engagement with the valve element B, and when said pressure-operated element D moves downwardly relatively to the supporting plate F, or moves towards said supporting plate, as hereinafter described, the valve element B will open, due to the fact that the seat B' will move away from the valve element B.

It is immaterial how the valve element B is maintained in spaced relationship with the supporting plate F, but I have herein illustrated said valve element as being provided with a rigid stem 8, whose lower end is pivotally attached at 9 to the supporting plate F. Normally, the annular diaphragm that constitutes the bottom pressure-operated element E of the structure is maintained in a downwardly inclined position, or in other words, in a position with its outer edge located in a lower horizontal plane than the central portion of said diaphragm which is attached to the collar 2ª on the roof of the container. Various means can be used to attain this position of the element E, but I prefer to design or construct the supporting plate F and the parts sustained by same so that the combined weight of said supporting weight and parts is great enough to deflect the element E downwardly, or hold said element E in a downwardly inclined position, as shown in Figure 3, when the container A is under normal pressure. In order to make it clear that the element E must normally be subjected to a load or downward force sufficient to hold it in a downwardly flexed condition or position, I have shown a weight 10 attached to the underside of the supporting plate F in the form of my invention illustrated in Figures 3, 4 and 5. When the pressure in the container becomes abnormal, or in other words, when the internal pressure of the container builds up to such a degree or extent that it becomes desirable or necessary to vent the container, the additional upward force exerted on the element D causes the bottom diaphragm or element E to flex upwardly into the position shown in Figure 4. During such upward flexing or the movement of the bottom diaphragm E, the seat B' of the valve element B remains at rest, but the valve element B moves bodily away from its seat into the position shown in Figure 4, thereby permitting sufficient gases to escape from the container through the opening between the valve element B and its seat B' to vent the container and provide pressure relief. Various means may be used to hold said valve seat at rest when the bottom diaphragm E flexes upwardly, as just described, but one means that I have found to be very satisfactory for this purpose consists of a stop rod 11, attached to and projecting downwardly from the pressure-operated element D through the passageway 2, and a stop 12 at the lower end of said rod arranged so that after the element D has moved upwardly a certain distance or into a certain position, said stop 12 will engage a stationary device, such, for example, as the lower end of the collar 2ª that constitutes the passageway 2, and thus prevent further upward movement of the element D and the valve seat B' carried by same.

If the upward pressure on the element D is continued after the stop 12 has engaged its coacting stationary part, the pressure which then exists in the container A will be exerted on the supporting plate F in a direction to bodily raise said supporting plate, or move it upwardly into the position shown in Figure 4, such bodily upward movement of the supporting plate F being made possible by reason of the fact that said supporting plate is sustained by a flexible element, to wit, the bottom diaphragm E, which is capable of flexing upwardly, when subjected to an upward force or pressure in excess of the weight or load of the supporting plate F. To state it in another way, a normal pressure in the container causes the top pressure-operated element D to be subjected to an upward force or pressure that presses the valve seat B' more tightly against the valve element B, but this upward force or pressure is not sufficient to bodily raise the supporting plate F, or cause the bottom diaphragm E to flex upwardly. However, when an abnormal pressure builds up in the container, the stop 12 on the rod 11 comes into action to arrest or limit the upward movement of the element D, and immediately thereafter, the supporting plate F starts to move upwardly, with the result that the valve element B, whose stem 8 is attached to the supporting plate F, moves bodily away from its seat B', thus venting the container. After the container has been vented, the parts of the valve structure return to the position shown in Figure 3, and so long as any positive pressure exists in the container, the element D is subjected to pressure in a direction tending to enhance the seating action of the valve element B. In order that the valve may be adjusted so as to change or vary the internal pressure at which the container vents, or in other words, to change the degree of internal pressure of the container which causes the valve element B to open to provide pressure relief, means is provided for increasing or decreasing the distance between the stop 12 and the element D. Various kinds of means may be used for this purpose, but I have herein illustrated the stop rod 11 as projecting upwardly through a hole in the element D, and adjustably connected with the element D in such a way that said rod can be adjusted downwardly or upwardly so as to vary the distance between the stop block 12 and the element D. In order to prevent leakage of gases through the opening in the element D up through which the stop rod 11 projects, the upper end portion of said stop rod is housed within a gas-tight housing 13 that is preferably removably mounted on the top side of the element D so as to provide access to the adjusting means for the stop rod.

It is believed that from the foregoing description it will be clear that in my improved valve the pressure of the gaseous medium confined in the container is exerted on the element D in a way to prevent accidental opening, leakage or unseating of the valve element B when the container is under a normal pressure, and that when the pressure in the container exceeds a certain approximate degree, the bottom diaphragm E flexes or moves in a direction to cause the valve element B to unseat and provide pressure relief for the container. In addition to having the two desirable characteristics just mentioned, my improved valve has the added feature of being constructed so that the valve element B will open automatically and permit air to enter the container in the event a dangerous minus pressure is created in the container. This venting of the container to provide vacuum relief is effected by the element D, and results from the fact that said element D is mounted on or combined with the supporting plate F in such a way that a partial vacuum in the container, or a certain approximate minus pressure, causes the element D to move downwardly towards the supporting plate F, whereupon the valve element B will open, due to the fact that the valve seat B', which is carried by the element D, moves downwardly away from the valve element B, as shown in Figure 5.

Under normal pressure the element D is maintained at a certain approximate distance above the supporting plate F, as shown in Figure 3, by the pressure in the gas chamber C of the valve, or by the combined action of said pressure and the supporting springs 6. In the event a dangerous minus pressure is created in the container, the suction or downward pull that is exerted on the element D moves said element D downwardly into the position shown in Figure 5. Due to the fact that the valve element B is sustained or held against downward movement by the supporting plate F, and the valve seat B' is carried by the element D that has moved downwardly, air will enter the gas chamber C of the valve and afford vacuum relief.

As previously stated, a vent valve of the construction above described is inexpensive to construct; it is easy to install; and it can be used on rigid top containers and various other types and kinds of containers for storing gases and/or volatile liquids to safeguard the container against injury or damage, resulting from excessive positive pressure or minus pressure.

The valve shown in Figure 2 is similar in general construction and principle of operation to the valve illustrated in Figures 1, 3, 4 and 5, except that the bottom diaphragm or pressure-operated element is arranged in a slightly different manner, i. e., the pressure-operated element E' has its outer edge connected to a rigid flange or collar $3^a$ on the roof of the container and the central portion of said diaphragm is perforated and is attached to a tubular member $2^{aa}$ fastened to the supporting plate F at a center opening in said supporting plate, the portion of the roof of the container to which the collar $3^a$ is attached being provided with a hole so as to establish communication between the container and the chamber C of the valve. The weight $10^a$ that is relied upon to normally hold the bottom diaphragm E' in a downwardly flexed condition is mounted on the top side of said diaphragm. In all other respects the valve shown in Figure 2 is the same as the valve shown in Figure 1.

Figures 6, 7 and 8 illustrate a form of my invention wherein both of the pressure-operated elements that are used to move the vent valve to provide pressure relief and vacuum relief and also to enhance the seating action of said valve, consists of flexible members. Thus, as shown in said figures, the valve is equipped with a gas chamber C' that comprises a flexible top part $D^2$ that constitutes a top diaphragm or pressure-operated element, and a flexible part $E^2$ that constitutes a bottom diaphragm or pressure-operated element. The side wall of said gas chamber C' is formed partly by a flange or collar $3^b$ on the roof of the container attached to the outer edge of the bottom diaphragm $E^2$, and partly by a rigid annular member $4^b$ interposed between the inner edge of the diaphragm $E^2$ and the outer edge of the top diaphragm $D^2$. Said gas chamber C' is maintained in constant communication with the gas space of the container by means of any suitable kind of gas passageway 2, such, for example, as a hole formed in the portion of the roof of the container to which the collar $3^b$ is attached. Said annular side wall portion $4^b$ of the gas chamber carries a valve seat G' that co-operates with a vent valve G. The vent valve G is, in turn, pivotally attached to one end of a lever $8^b$ that is pivotally mounted on an upwardly-projecting support $9^b$ attached to the annular side wall portion $4^b$ of the gas chamber. The outer end of said lever $8^b$ is connected to the top diaphragm $D^2$ in such a way that when said top diaphragm flexes upwardly, the valve G will be pressed more tightly into its seat G', and when said top diaphragm flexes downwardly, the valve element G will be opened or unseated, so as to provide vacuum relief. In the form of my invention herein illustrated the connection between the top diaphragm $D^2$ and the right hand end of the lever $8^b$ is formed by a rod 16. In order that the valve element G will open to provide pressure relief when a certain approximate pressure is created in the gas chamber C', a means similar to that employed in the valve shown in Figures 2, 3 and 4 is provided for automatically removing the enhanced seating action on the valve element G, produced by the top diaphragm $D^2$ and to cause said valve to open to provide pressure relief when an abnormal pressure is created in the gas chamber. Said means is herein illustrated as consisting of a stop rod $11^a$, formed usually by an extension of the rod 16 previously referred to, and provided at its lower end with a stop black $12^a$ that is adapted to co-act with a stationary member, such, for example, as the roof 1 of the container, said stop rod $11^a$ being adjustably connected by clamping nuts 17 or an equivalent means with the top diaphragm $D^2$, so that the length of said stop rod can be easily varied to change the internal pressure at which the container will vent to provide pressure relief. When the container is under normal pressure, the parts of the valve assume the position shown in Figure 6, i. e., the bottom diaphragm $E^2$ occupies a substantially horizontal position, and the top diaphragm $D^2$ is flexed upwardly by the pressure in the gas chamber C', thus causing the lever $8^b$ to exert pressure on the valve element G in a direction tending to force said valve element more tightly against its seat G'. If the internal pressure of the gas chamber C' reaches such a degree that the stop black $12^a$ is pressed tightly against its co-acting stationary part 1, a further increase in the internal pressure of the container causes the bottom diaphragm $E^2$ to flex upwardly into the position shown in Figure 7. During such upward flexing of the bottom diaphragm $E^2$ the valve seat G' and also the support $9^b$ for the valve operating lever $8^b$, move bodily in an upward direction. The pivotal connection 18, between the valve lever $8^b$ and the link 16, however, cannot move upwardly, inasmuch as the link or rod 16 forms a continuation of the stop rod 11, which at this time is stationary, and hence, the valve operating lever $8^b$ will rock on the pivot 18 as an axis, sufficiently to cause the valve element G to unseat and relieve the abnormal pressure in the gas chamber C', which, as previously stated, is in direct communication with the gas space of the container. After the container has vented in the manner just described, the bottom diaphragm $E^2$ resumes its normal horizontal position, whereupon the lever $8^b$ is free to rock on the support $9^b$ under the influence of the pressure imparted to same by the top diaphragm $D^2$, thereby causing the valve element G to remain tightly seated. If a dangerous minus pressure is created in the container, the top diaphragm $D^2$ will flex downwardly, as shown in Figure 8, with the result that the rod or link 16 will rock the lever $8^b$ in a direction to unseat the valve element G and admit sufficient air to the gas chamber C' to provide vacuum relief for the container. Inasmuch as my present invention relates to a complete, self-contained valve structure, all of whose parts are separate and distinct from the container on which the valve structure is used, I have omitted from the claims all reference to the pressure in the container, and have used the term "gas connecting passageway" to mean any kind of an opening, conduit, or space for establishing communication between the gas chamber of the valve and the interior of the container on which the valve is used.

Having thus described my invention, what I claim as new and desire to secure by Letters Patent is:

1. A vent valve structure for containers used to store gases and/or volatile liquids, comprising a gas chamber separate and distinct from but adapted to be placed in communication with the interior of the container, a vent valve for said gas chamber, and two movable actuating elements for said vent valve, forming wall portions of said gas chamber and arranged so that pressure in said gas chamber below a certain approximate degree is exerted on one of said actuating elements in a manner to enhance the seating action of said vent valve and pressure in said gas chamber above a certain approximate degree is exerted on the other actuating element in a manner to cause said vent valve to open to provide pressure relief for said gas chamber.

2. A vent valve structure for containers used to store gases and/or volatile liquids, comprising a gas chamber separate and distinct from but adapted to be placed in communication with the interior of the container, a vent valve for said gas chamber, a movable actuating element forming a wall portion of said gas chamber, arranged so that under certain conditions a positive pressure in said gas chamber will be exerted on said movable actuating element in a manner to enhance the seating action of said vent valve and under different conditions a minus pressure in said gas chamber will cause said actuating element to function to open said valve to provide vacuum relief, and a separate and distinct movable actuating element forming a wall portion of said gas chamber and arranged so that an abnormal, positive pressure in said gas chamber causes said second actuating element to function to open said valve to provide pressure relief for said gas chamber.

3. A vent valve structure for rigid and breather type containers, in which gases and/or volatile liquids are stored, said valve structure comprising the following parts or elements combined so as to produce a complete or self-contained pressure-controlled device that is adapted to be connected with the gas space of the container, to wit, a normally-closed vent valve that is adapted to open and relieve excessive pressure in the gas space of the container, a means rendered operative by the internal pressure of said gas space for enhancing the seating action of said vent valve when the internal pressure builds up, and a second means also rendered operative by the internal pressure of the gas space of the container for destroying the enhanced seating action produced on said valve by said first mentioned means in the event said internal pressure becomes excessive, thereby permitting said valve to open and vent the gas space.

4. A vent valve structure of the kind described in claim 3, in which the pressure-operated means first referred to, is also rendered operative by a minus pressure in the gas space of the container, to effect the opening or unseating of said valve to provide vacuum relief for said gas space.

5. A vent valve structure for rigid and breather type containers, in which gases and/or volatile liquids are stored, said valve structure comprising the following parts or elements combined so as to produce a complete or self-contained pressure-controlled device that is adapted to be connected with the gas space of the container, to wit, a normally closed vent valve that is adapted to open and relieve excessive pressure in the gas space of the container, a diaphragm rendered operative by the internal pressure of said gas space for enhancing the seating action of said vent valve when the internal pressure builds up, and a diaphragm also rendered operative by the internal pressure of the gas space of the container for destroying the enhanced seating action produced on said valve by said first mentioned diaphragm in the event said internal pressure becomes excessive, thereby permitting said valve to open and vent the gas space.

6. A vent valve structure of the kind described in claim 3, in which the pressure-operated diaphragm first referred to is also rendered operative by a minus pressure in the gas space of the container, to effect the opening or unseating of said valve to provide vacuum relief for said gas space.

JOHN H. WIGGINS.